United States Patent
Lam et al.

(10) Patent No.: US 7,522,627 B2
(45) Date of Patent: Apr. 21, 2009

(54) SYSTEM AND METHOD FOR PACKET FORWARDING

(75) Inventors: Vincent Lam, Mountain View, CA (US);
Adrian Caceres, Los Gatos, CA (US);
Joseph R. Eykholt, Los Altos, CA (US);
Lawrence Huston, Wexford, PA (US)

(73) Assignee: Nokia Corporation, Espoo (FI)

( * ) Notice: Subject to any disclaimer, the term of this patent is extended or adjusted under 35 U.S.C. 154(b) by 994 days.

(21) Appl. No.: 10/244,146

(22) Filed: Sep. 13, 2002

(65) Prior Publication Data
US 2003/0072318 A1 Apr. 17, 2003

Related U.S. Application Data

(60) Provisional application No. 60/322,555, filed on Sep. 14, 2001.

(51) Int. Cl.
*H04L 12/28* (2006.01)
*H04L 12/56* (2006.01)
*H04L 12/54* (2006.01)

(52) U.S. Cl. ........................ 370/427; 370/428

(58) Field of Classification Search ............... 370/252, 370/468, 463, 419, 258, 332, 346, 214, 218, 370/360, 388, 387, 428, 328, 401, 254, 251, 370/338, 429, 392, 427, 395, 389, 412, 331, 370/400, 390, 432, 410; 709/250, 240, 241, 709/251, 252, 243, 102, 227, 222, 223, 238, 709/237, 221, 245, 230, 231, 202; 707/3; 726/11, 22, 24; 719/320, 329, 314; 713/153, 713/201, 171, 165, 155, 191, 2, 600, 160, 713/150; 718/103, 107; 714/38; 711/170; 455/433
See application file for complete search history.

(56) References Cited

U.S. PATENT DOCUMENTS

| | | | | |
|---|---|---|---|---|
| 4,899,333 | A | * | 2/1990 | Roediger .................... 370/427 |
| 5,469,571 | A | * | 11/1995 | Bunnell ....................... 718/103 |
| 5,835,727 | A | | 11/1998 | Wong et al. ............. 395/200.68 |
| 5,848,233 | A | | 12/1998 | Radia et al. ............. 395/187.01 |
| 6,104,700 | A | | 8/2000 | Haddock et al. ............. 370/235 |
| 6,262,976 | B1 | * | 7/2001 | McNamara .................. 370/254 |
| 6,363,477 | B1 | | 3/2002 | Fletcher et al. ............. 713/151 |
| 6,496,935 | B1 | | 12/2002 | Fink et al. .................... 713/201 |
| 6,505,244 | B1 | | 1/2003 | Natarajan et al. ........... 709/223 |
| 6,658,565 | B1 | * | 12/2003 | Gupta et al. ................. 713/153 |

(Continued)

OTHER PUBLICATIONS

Cho, Kenjiro, A Framework for Alternate Queueing: Towards Traffic Management by PC-UNIX based Routers, Sony Computer Laboratory, Inc., USENIX Annual Technical Conference, 1998, pp. 247-258.*

(Continued)

*Primary Examiner*—Wing F Chan
*Assistant Examiner*—Prenell P Jones

(57) ABSTRACT

The present invention provides a system and method for packet forwarding. The packet forwarding improves the performance of common network security applications. The system includes an operating system kernel, a plurality of packet forwarding paths, and a packet classifier. The method includes receiving network packets, receiving state information from a plurality of external agents, selecting a forwarding path from a plurality of forwarding paths based on the state information, and transmitting packets.

29 Claims, 4 Drawing Sheets

U.S. PATENT DOCUMENTS

| | | | |
|---|---|---|---|
| 6,738,387 B1* | 5/2004 | Lin et al. | 370/429 |
| 6,807,667 B1* | 10/2004 | Bar et al. | 719/320 |
| 7,051,365 B1* | 5/2006 | Bellovin | 726/11 |
| 7,051,367 B1* | 5/2006 | Krishnaswamy et al. | 726/22 |
| 7,200,684 B1* | 4/2007 | Schales et al. | 709/252 |
| 7,395,356 B2* | 7/2008 | Ma et al. | 709/250 |
| 2001/0054055 A1* | 12/2001 | Bollella | 709/102 |
| 2002/0029288 A1* | 3/2002 | Dobbins et al. | 709/238 |
| 2002/0031107 A1* | 3/2002 | Li et al. | 370/338 |
| 2002/0083316 A1* | 6/2002 | Platenberg et al. | 713/2 |
| 2002/0104017 A1* | 8/2002 | Stefan | 713/201 |
| 2002/0114338 A1* | 8/2002 | Craig et al. | 370/401 |
| 2004/0165613 A1* | 8/2004 | Kim et al. | 370/463 |
| 2005/0083936 A1* | 4/2005 | Ma | 370/392 |

OTHER PUBLICATIONS

Ho-Yen Chang, S. Felix Wu, Y. Frank Jou, Real-Time Protocol Analysis for detecting link-state routing protocol stacks Feb. 2001, ACM Transactions on Information and System Security (TISSEC), vol. 4 Issue 1 Publisher: ACM Press; pp. 8-10, 16, 32, 35 and 36.*

T.V. Lakshman et al., "High-Speed Policy-Based Packet Forwarding Using Efficient Multi-Dimensional Range Matching", *Proceedings of ACM SIGCOMM*, 13 pages, 1998.

Noureidien et al., "A Stateful Inspection Module Architecture," *Proceedings of IEEE Tencon 2000, IEEE Region 10 Conference*, XP000987985 Kuala Lumpur, Section 1.1, pp. 259-265 (2000).

"International Search Report, International Application No. PCT/US2002/029094".

Decasper, Dan, et al., "Router Plugins—A Software Architecture for Next Generation Routers", In proceedings of the ACM SIGCOMM '98 Conference, (1998), pp. 229-240.

Mosberger, David, et al., "Making Paths Explicit in the Scout Operating System", USENIX Association Second Symposium on Operating Systems Design and Implementation (OSDI '96), (1996), pp. 153-167.

Noureldien, A. N., et al., "A Stateful Inspection Module Architecture", Proceedings of IEEE TENCON 2000, IEEE Region 10 Conference (Sep. 24, 2000).

Xiaohu, Qie, et al., "Scheduling Computations on a Software-Based Router", Joint International Conference on Measurement and Modeling of Computer Systems Proceedings (2001).

Edwards, Aled et al., "Experiences Implementing a High Performance TCP in User-Space", Hewlett Packard Laboratories, Filton Rd. Bristol UK, SIGCOMM 1995, Cambridge, MA USA, (1995), 1-10.

* cited by examiner

SYSTEM AND METHOD FOR PACKET FORWARDING

RELATED APPLICATION

This application claims the benefit of U.S. Provisional Application No. 60/322,555 filed Sep. 14, 2001 the benefit of the earlier filing date of which is hereby claimed under 35 U.S.C. §119 (e).

FIELD OF THE INVENTION

The present invention relates generally to computer networks, and more specifically, to a system and method for forwarding packets in a firewall system.

BACKGROUND OF THE INVENTION

In a typical packet forwarding system, an incoming packet may take one of two forwarding paths: a "fast" path or a "slow" path. The fast path is coded for maximum speed but cannot handle exceptional error conditions or perform complex operations. The slow path can handle any packet format or network protocol state, but it requires extensive processor overhead and frequently is implemented at a different operating system kernel priority level.

Increasing demand for network security has driven the development of "network firewalls." Firewalls perform extensive validation on network packets, and the overhead from the additional validation limits network throughput. Firewalls have been implemented in the slow path because of the additional processing required and the difficulty of validating packets and comparing packets to network protocol state in the highest-priority levels of an operating system kernel.

SUMMARY OF THE INVENTION

The present invention is directed at addressing the above-mentioned shortcomings, disadvantages and problems, and will be understood by reading and studying the following specification.

According to aspects of the invention, a system and method are directed at accelerating packet forwarding. The system includes an operating system kernel, a plurality of packet forwarding paths, and a packet classifier. The operating system kernel implements a plurality of network protocol suites and includes a plurality of priority levels. The packet forwarding paths may be implemented in different priority levels or in the same priority level. The packet classifier dynamically selects among the plurality of forwarding paths. The system may further comprise a decision table to cache the results of the packet classifier. The decision table may include a series of special entries in the routing table. For example, the special entries may be flow next hops. The decision table entries may also include the context required for a network connection, for example, for a TCP connection or a UDP transaction. The loadable kernel module may be implemented at a different priority level from the forwarding path. The loadable kernel module may be cryptographically signed to authenticate its origin. The forwarding path may provide additional functionality including network address translation, packet filtering, dynamic stateful packet filtering, or an IPSec tunnel implementation.

A system for packet forwarding comprises means for receiving network packets, means for receiving state information from a plurality of external agents, means for selecting a forwarding path from a plurality of forwarding paths based on the state information, and means for transmitting packets.

According to other aspects of the invention, a method for packet forwarding includes means for receiving network packets, means for receiving state information from a plurality of external agents, means for selecting a forwarding path from a plurality of forwarding paths based on the state information, and means for transmitting packets. The external agents may comprise a plurality of user-level processes or may be implemented as a plurality of kernel tasks. The kernel tasks may be implemented as loadable kernel modules or device drivers. An extensible forwarding path is provided, comprising means for receiving packets from a first network interface, means for determining an output interface for a given packet, a plurality of extension modules to further process packets, and means for transmitting packets out on a second network interface. The first and second network interfaces may be the same network interface. The extension module may implement network address translation. The extension module may dynamically filter packets.

DETAILED DESCRIPTION OF THE PREFERRED EMBODIMENT

Figure 1:
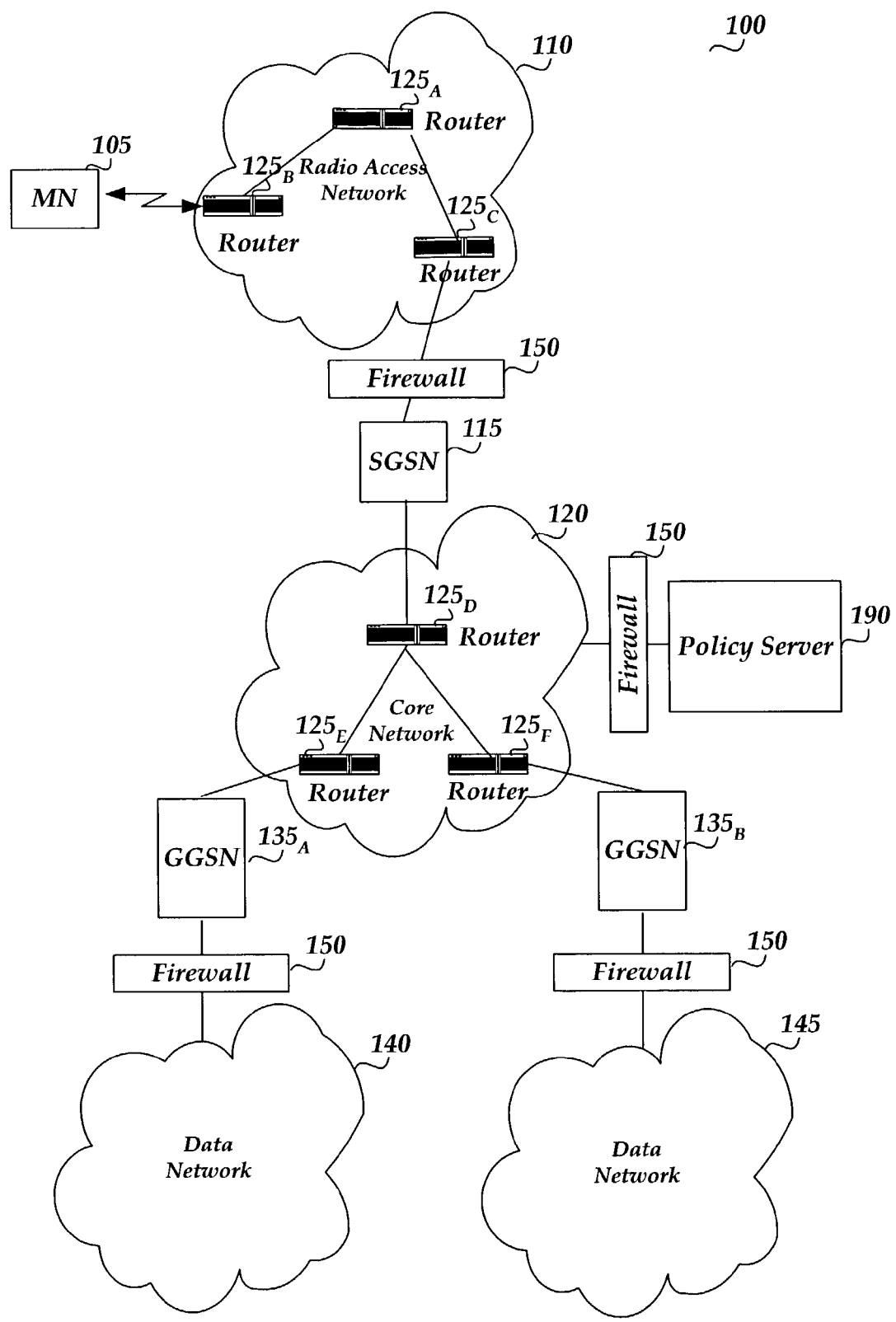
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. Referring to the drawings, like numbers indicate like parts throughout the views. Additionally, a reference to the singular includes a reference to the plural unless otherwise stated or is inconsistent with the disclosure herein.

Illustrative Operating Environment

With reference to FIG. 1, an exemplary IP network in which the invention may operate is illustrated. As shown in the figure, IP network 100 includes mobile node (MN) 105, radio access network (RAN) 110, SGSN 115, core network 120, routers $125_{A-F}$, policy server 190, GGSNs $135_{A-B}$, data network 140, data network 145, and firewalls 150.

The connections and operation for IP network 100 will now be described. MN 105 is coupled to radio access network (RAN) 110. Generally, MN 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as MN 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like. As shown in the figure, RAN 110 includes routers $125_{A-C}$. According to one embodiment of the invention, routers $125_{A-C}$ may be configured to accelerate packet forwarding in a firewall system.

Policy server 190, or some other dedicated network element, may be used to provide Quality of Service (QoS) rules relating to how the routers process the packets. Briefly described, policy server 190 may be used to monitor and aid in providing the appropriate behavior model for packet processing within the routers for IP based networks. According to one embodiment, each router may inform the policy server of information relating to its operation and receive information from the policy server to set the parameters appropriately.

Some nodes may be General Packet Radio Service (GPRS) nodes. For example, Serving GPRS Support Node (SGSN) 115 may send and receive data from mobile nodes, such as MN 105, over RAN 110. SGSN 115 also maintains location information relating to MN 105. SGSN 115 communicates between MN 105 and Gateway GPRS Support Node (GGSN)s $135_{A-B}$ through core network 120. According to one embodiment of the invention, policy server 190 communicates with RAN 110 and core network 120.

Core network 120 is an IP packet based backbone network that includes routers, such as routers $125_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units. According to one embodiment of the invention, routers $125_{A-C}$ and $125_{D-F}$, may be configured to accelerate packet forwarding in a firewall system.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow MS 105 to access network 140 and network 145.

The operator may set QoS rules to determine whether or not to accept a packet based on different service classes for a particular user or group of users. For example, conversational traffic from user group A may be carried using standard AF/EF behavior, whereas conversational traffic from user group B may be carried with DSUI behavior. The specific user of MN 105 may be differentiated into one of these user groups by an identifier associated with the user. For example, the identifier may be the user Mobile Station Integrated Services Digital Network (MSISDN) number that is known to both the SGSN and the GGSN support nodes.

Policy server 190 is coupled to core network 120 through communication mediums. Policy server 190 may be programmed by an operator with rules to manage the 3GPP quality-of-service (QoS) to IP QoS mapping for mobile IP network 100. More specifically, an operator may generate the rules that are used by the nodes on mobile IP network 100 to help ensure end-to-end QoS. These rules may be supplied to the nodes by policy server 190. Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

Firewalls, such as firewalls 150, may be placed at various locations to protect networks and nodes within a network from unauthorized access. Firewalls 150 may be implemented as a hardware device or as software that is contained within a network node.

Firewalls are typically deployed at choke points on a network, which also makes them ideal enforcement points for user policies. Policies may be applied for several reasons. Many institutions apply network address translation to reduce the number of addresses they must lease from an Internet service provider. As firewalls are typically deployed at network borders they are ideally positioned to apply address translation for Internet connections. Address translation changes packets, however, and may require not only the overhead of rewriting packets, but also overhead required to reroute the altered packets on a new path. These additional route lookups in the slow path contribute to the increased overhead and reduce potential throughput of the routing device. According to the present invention, the nodes operating as firewalls are configured to accelerate packet forwarding.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
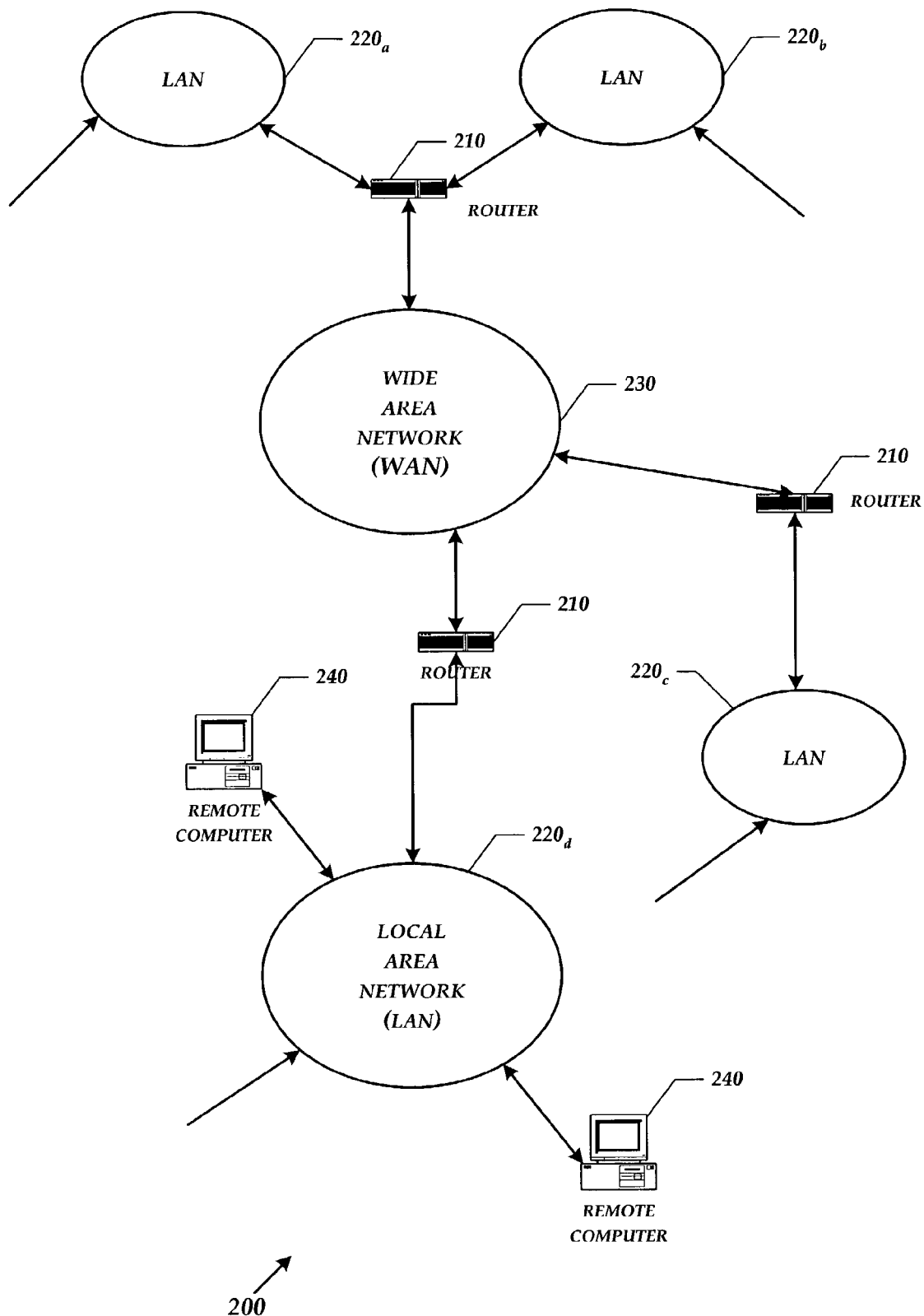
FIG. 2 shows a schematic diagram that illustrates an exemplary system overview in which local area networks and a wide area network are interconnected by routers.

FIG. 2 shows another exemplary system in which the invention operates in which a number of local area networks ("LANs") $220_{a-d}$ and wide area network ("WAN") 230 interconnected by routers 210. On an interconnected set of LANs—including those based on differing architectures and protocols—, a router acts as a link between LANs, enabling messages to be sent from one to another.

Routers 210 are configured such that they may accelerate packet forwarding in accordance with aspects of the invention. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either LANs 220$_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Router Packet Forwarding

Figure 3:
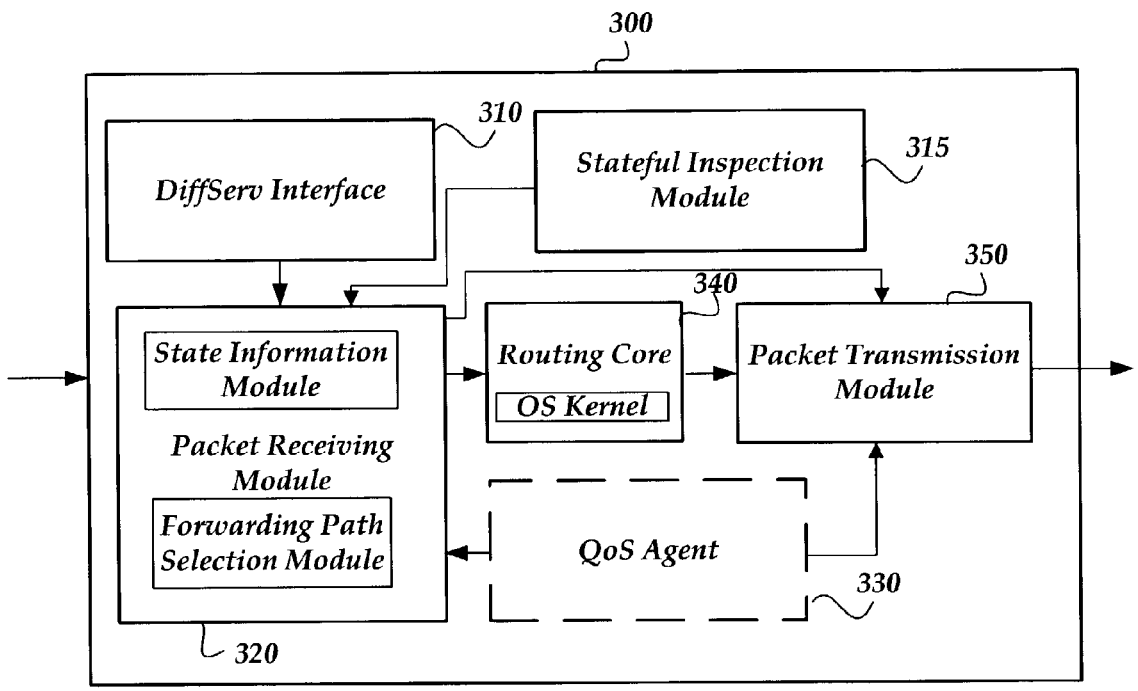
FIG. 3 illustrates an overview block diagram of a router.

FIG. 3 illustrates a block diagram of an exemplary router in accordance with aspects of the invention. As shown in the figure, router 300 includes DiffServ interface 310, Stateful Inspection Module 315, packet receiving interface 320, QoS agent 330, routing core 340, and packet transmission interface 350. Router 300 may include many more components than those shown in FIG. 3. However, the components shown are sufficient to disclose an illustrative embodiment for practicing the present invention.

As illustrated, router 300 is divided into five functional blocks. Routing core 340 provides a router's normal routing and switching functionality. One of the functionalities of the routing core is to select the packet transmission interface for data packets entering through the packet receiving interface. The routing core moves packets between interfaces according to set policies. For purposes of this discussion, routing core 340 can be thought of as an infinite bandwidth, zero-delay backplane connecting interfaces.

DiffServ interface 310 monitors and provisions DiffServ operating parameters. Monitored parameters may include statistics regarding traffic carried at various DiffServ service levels. These statistics may be used for accounting purposes and/or for tracking compliance to Traffic Conditioning Specifications (TCSs) negotiated with customers. Provisioned parameters are primarily the TCS parameters for Classifiers and Meters and the associated per-hop behavior (PHB) configuration parameters for actions and queuing elements. The operator, typically through a system administrator, interacts with DiffServ interface 310 through one or more management protocols, such as SNMP or COPS protocol, or through other router configuration tools. The operator may interact with DiffServ interface 310 through a policy server, a serial terminal, a telnet console, and the like.

Specific policy rules and goals governing the DiffServ behavior of a router are typically installed by policy management mechanisms. However, some DiffServ routers may be limited to the kinds of policies which can be successfully implemented by the router.

Packet receiving interface 320, routing core 340 and packet transmission interface 350 are illustrated at the center of the diagram illustrating router 300. In actual router implementations, there may be any number of packet receiving and packet transmission interfaces interconnected by the routing core. The routing core element serves as an abstraction of a router's normal routing and switching functionality.

Stateful inspection module 315 provides state information relating to the flow to state information module 312. State information may include different information, including, for example, a flow type, policy information, and quality of service parameters.

Optional QoS block 330 may be used to help enforce QoS requirements. Router 300 may snoop or participate in either per-microflow or per-flow-aggregate signaling of QoS requirements, e.g. using the RSVP protocol. Snooping of RSVP messages may be used, for example, to learn how to classify traffic without actually participating as a RSVP protocol peer. Router 300 may reject or admit RSVP reservation requests to provide a means of admission control to DiffServ-based services or it may use these requests to trigger provisioning changes for a flow-aggregation in the network. If QoS block 330 is included in router 300, it may only be active in the control plane and not in the data plane. In this case, RSVP could be used merely to signal a reservation state without installing any actual reservations in the data plane of router 300. The data plane could still act purely on DiffServ DSCPs and provide PHBs for handling data traffic without the normal per-microflow handling expected to support some services.

Packet receiving interface 320 provides classification, metering, action, and queuing elements. Classifiers are parameterized by filters and output streams. Packets from the input stream are sorted into various output streams by filters which match the contents of the packet or possibly match other attributes associated with the packet. The simplest packet classifier element is one that matches all packets that are applied at its input. In this case, the packet classifier may be omitted. A classifier may also classify the input streams according to their service class.

Packet receiving interface 320 may be configured to identify traffic into classes, meter it, and ensure that any excess traffic is appropriately dealt with according to the PHB. For example, for AF behavior, this may mean marking excess traffic; for EF, this may mean dropping excess traffic or shaping it to a maximum rate.

A packet arriving at packet receiving interface 320 picks up its policy from a classifier, which selects traffic according to some specification for each traffic class. Typically, a classifier identifies a variety of traffic and breaks it up into separate classes. According to one embodiment of the invention, packets are classified according to an importance priority and an urgency priority. More priorities may be implemented.

For network planning and perhaps other business purposes, such as for billing purposes, arriving traffic is normally counted. Therefore, a count action is configured. Also, traffic may be marked or remarked with the appropriate DSCP by a mark action. The operator may select the importance and urgency levels according to their business model. For instance, if the operator desires to maximize instant revenues, importance should have a direct relationship to the financial benefit of the packet to the network operator. When the objective of the operator is to support the primary business of the enterprise, preference could be given to those applications that are important to reach that objective.

Marking of the packet priorities is typically done in the first node that is controlled by the network operator. The packet typically does not need further marking by any of the other nodes. According to another embodiment of the invention, marking of the packet may be done in the mobile node. Under this scenario, a confidential relationship between the user and the operator is established. Packets may also be re-marked. For instance, the packets may be re-classified at the boundaries between network domains.

A metering element may be used to determine whether the stream is within a predetermined rate by monitoring real-time traffic conditions. As a result of the information obtained by the metering element actions may be triggered within the router. For example, a metering element may be used to determine when the customer is being served according to their service level agreement (SLA). A meter measures the rate at which packets making up a stream or flow of traffic pass it, compares the measured rate to some set of thresholds and produces some number of potential results. A packet is said to conform to a specified level if, at the time that the packet is being examined, the stream appears to be within the rate limit for the profile associated with that level.

An action element sets the action to be applied to the packet. For example, the action element may mark a packet, drop a packet according to the classification and queue in question, multiplex, count, or perform a null action. Actions are events in a DiffServ interface that may affect the packet. An action may calculate statistics on traffic in various configured classes, mark it with a DSCP, drop it, or queue it before passing it on for other processing.

DiffServ codepoint (DSCP) Markers are elements which set a codepoint (e.g. the DSCP in an IP header). The DSCP markings are typically applied either by a trusted upstream node, e.g. a customer, or by the edge routers on entry to the DiffServ network. DSCP Markers may also act on unmarked packets (e.g. those submitted with DSCP of zero) or may re-mark previously marked packets. The mark set in a packet will determine its subsequent PHB treatment in downstream nodes of a network and possibly also in subsequent processing stages within router 300. DSCP Markers for DiffServ are normally parameterized by a single parameter: the 6-bit DSCP to be marked in the packet header.

Packet transmission interface 350 is arranged to receive data from DiffServ interface 310, routing core 340, and QoS block 330. Packet transmission interface 350 also includes an output for outputting packets using the appropriate behavior that is selected according to the operation point parameter. As mentioned above, many actions may be applied to the packets.

Queuing elements modulate the transmission of packets belonging to the different traffic streams and determine their ordering, possibly storing them temporarily or discarding them. Packets are usually stored either because there is a resource constraint (e.g., available bandwidth) which prevents immediate forwarding, or because the queuing block is being used to alter the temporal properties of a traffic stream (i.e. shaping). However, when several queues are used together in a queuing system, they can also achieve effects beyond that for given traffic streams. They can be used to limit variation in delay or impose a maximum rate (shaping), to permit several streams to share a link in a semi-predictable fashion (load sharing), or to move variation in delay from some streams to other streams.

A scheduler is an element which gates the departure of each packet that arrives at one of its inputs, based on a service discipline. The scheduler typically has one or more inputs and one output. Each input has an upstream element to which it is connected, and a set of parameters that affects the scheduling of packets received at that input. The scheduler may utilize a variety of scheduling algorithms, including, but not limited to, first come first served, strict priority, weighted fair bandwidth sharing, rate-limited strict priority and rate-based. Schedulers may be used to shape traffic streams to match some profile by delaying packets that might be deemed nonconforming by some downstream node: a packet is delayed until such time as it would conform to a downstream meter using the same profile. PHBs, such as the class selectors, AF/EF, or DSUI have descriptions or configuration parameters which strongly suggest the sort of scheduling discipline needed to implement them.

Packet Forwarding Method and System

In a typical packet forwarding system, there is a tradeoff of speed versus security. Filtering network packets is used to achieve security, but dynamic stateful packet filters must compare each network packet to an external state table to determine whether a packet should be allowed through. Filtering decisions are made based on the contents of the entire packet plus additional state information from previously received packets and potentially application-layer data. Comparisons must be made on the slow path because the entire assembled packet is required for the stateful packet filtering engine.

Operating system kernels implement network protocols at a plurality of priority levels. At the lowest layers of the kernel, device drivers are responsible for interacting directly with computer hardware. In the context of computer networks, device drivers will interact with network interface buffers and pass a series of buffers to higher layers for processing. Those higher layers will then perform protocol verification checks and any network routing that must occur. The higher-layer functions specific to the Internet Protocol are described in RFC 1812 and its revisions. One source of overhead on the slow path is memory copies between buffers at different priority layers of the kernel. A second source of overhead is the requirement to save kernel state when transitioning between different priority layers.

The fast path is a direct forwarding operation that combines low overhead with high throughput by forwarding at high-priority layers and eliminating context switching overhead. However, it is not able to access contextual information from a network transaction and therefore is not suited to filter packets for security purposes.

This invention combines the filtering capability of the slow path with the high throughput of the fast path by using an extensible forwarding path to receive state information from low-priority kernel layers to accelerate the forwarding and filtering decisions at the highest possible kernel priorities.

A notion of "flows" is applied to uniquely identify traffic belonging to specific network connections and to specify how the traffic associated with those connections is forwarded. Caching the state in the forwarding path enables the packet forwarding system to selectively bypass the high-overhead slow path firewall processing for subsequent packets belonging to those connections. These subsequent packets may thus be forwarded at a high priority level, thereby significantly improving forwarding performance while maintaining security. An embodiment of the present invention also further reduces overhead by moving address translation into the high-priority forwarding path so that additional route lookups are not required.

Figure 4:
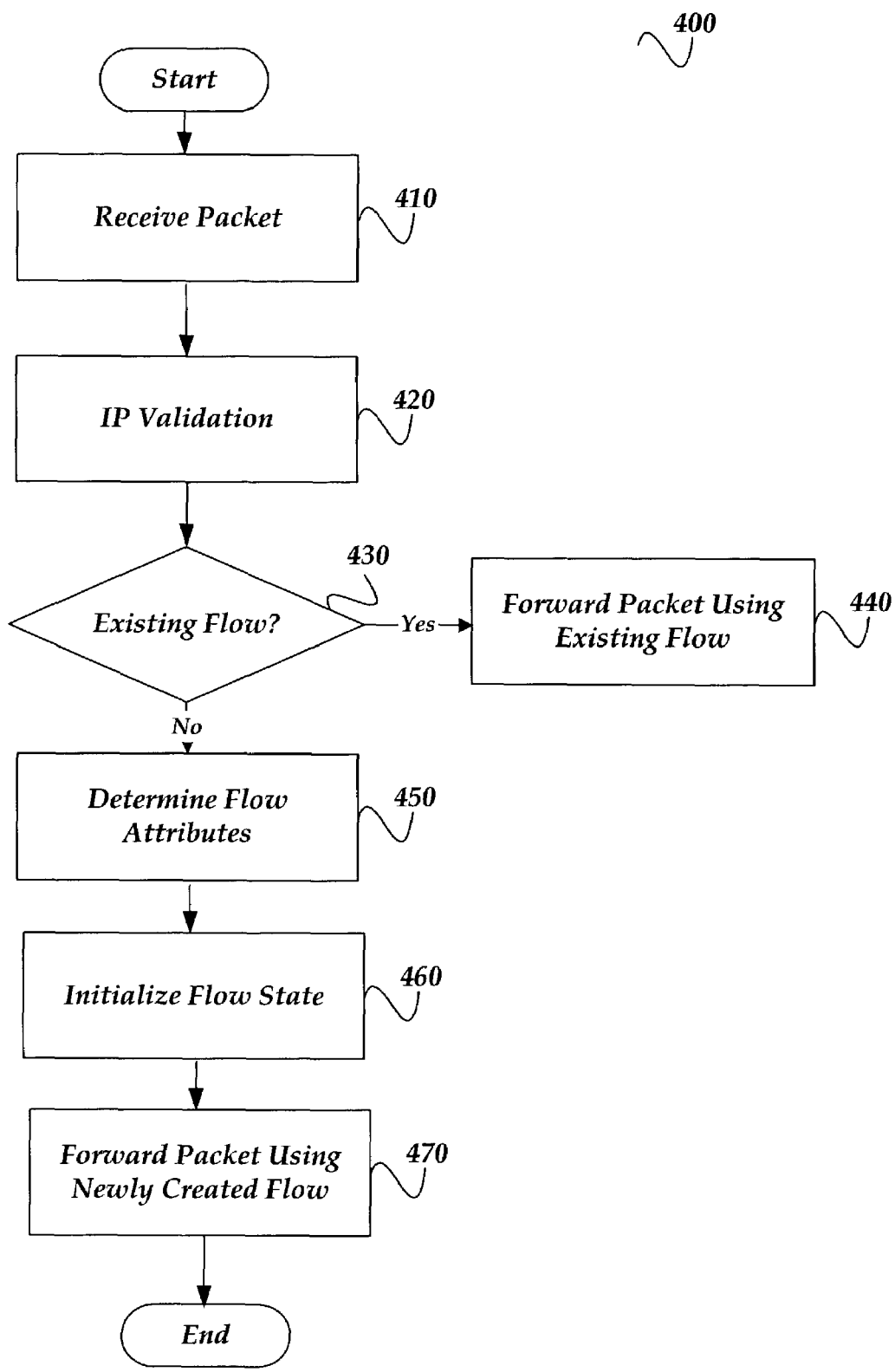
FIG. 4 illustrates a process for packet forwarding; in accordance with aspects of the invention.

FIG. 4 is a flowchart 400 that illustrates a method for packet forwarding in accordance with an embodiment of the present invention. After a start block, the process flows to block 410 where a packet is received on a network interface. Moving to block 420, the received packet is passed to the IP layer for IP validation. IP validation may be used to determine if the packet includes a valid IP address. Transitioning to decision block 430, a determination is made as to whether this is part of an existing flow. A forwarding lookup is performed to determine whether the packet is part of an existing flow. This may be performed by a lookup in the system forwarding table or by a lookup into a dedicated flow table. In one embodiment of the present invention, the existence of a flow may be determined by the entries in the forwarding table. A forwarding table may include route entries for standard IP forwarding and flow entries for flow forwarding. Entries in the forwarding table may refer to a next hop entry that describes how to forward the packet. For route entries, the next hop describes which router the packet should be forwarded to next. Link level information such as the MAC address of the next router may also be included. For flow entries, the next hop entry includes information associated with the flow. The use of flow entries in the forwarding table significantly reduces forwarding overhead by enabling each packet in a flow to be forwarded with just a single route lookup.

When the packet is part of an existing flow, the process moves to block 440 where the packet is forwarded in accordance with the existing flow. When the packet is not part of an existing flow, then a new flow may be created. A data structure may be allocated to store information associated with the flow. At block 450, the packet is passed to a packet classifier in order to determine the flow attributes. A flow may have many associated attributes including, for example, a flow type, policy information, and quality of service parameters. Flow attributes may be stored as parameters that are included in the flow state.

Transitioning to block 460, the flow state may be initialized. The initial state of the flow may be a function of the flow type, input and output ports, and may include policy information. As part of the flow initialization state, the new flow may be announced to other members of a forwarding cluster so that all members have flow information for every connection.

After the flow is created, the process moves to block 470 where the packet may be forwarded using the newly created flow. Statistics associated with the flow may be updated and the flow policy may be evaluated. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for packet forwarding, comprising:
    an operating system kernel which is configured to implement a plurality of network protocol suites and which has a plurality of different kernel priority levels;
    a plurality of packet forwarding paths, wherein the packet forwarding paths are associated with the plurality of different kernel priority levels; and
    a packet classifier configured to dynamically select a forwarding path from the plurality of forwarding paths.

2. The system of claim 1, further comprising a decision table configured to cache the results of the packet classifier.

3. The system of claim 2, wherein the decision table comprises a series of entries in the routing table.

4. The system of claim 3, wherein the entries are flow entries.

5. The system of claim 3, wherein the decision table entries include a network connection context.

6. The system of claim 5, wherein the network connection context is associated with a TCP connection.

7. The system of claim 5, wherein the network connection context is associated with a UDP transaction.

8. The system of claim 7, wherein the packet classifier is configured to be implemented by a user-level process.

9. The system of claim 7, wherein the packet classifier is implemented by a loadable kernel module.

10. The system of claim 7, wherein the packet classifier is implemented by a device driver.

11. The system of claim 9, wherein the loadable kernel module may be implemented at a different priority level from the forwarding path.

12. The system of claim 9, wherein the loadable kernel module is cryptographically signed to authenticate its origin.

13. The system of claim 1, wherein the forwarding path further comprises a module that provides additional functionality beyond packet forwarding.

14. The system of claim 13, wherein the additional functionality module comprises a network address translator.

15. The system of claim 13, wherein the additional functionality module comprises a packet filter.

16. The system of claim 13, wherein the additional functionality module comprises a dynamic stateful packet filter.

17. The system of claim 13, wherein the additional functionality module comprises an IPSec tunnel implementation.

18. A system for packet forwarding, comprising:
    means for receiving network packets;
    means for receiving state information from a plurality of kernel tasks;
    means for selecting a forwarding path from a plurality of forwarding paths based on the state information; and
    means for transmitting the network packets.

19. The system of claim 18, wherein kernel tasks are implemented as a loadable kernel module.

20. The system of claim 18, wherein kernel tasks are implemented as a device driver.

21. A method for packet forwarding, comprising:
    receiving a network packet;
    receiving state information from kernel tasks;
    selecting a forwarding path from forwarding paths based on the state information; and
    transmitting the network packet.

22. The method of claim 21, further comprising caching the selected forwarding path with a flow entry.

23. The method of claim 22, further comprising synchronizing flow entries between members of a packet forwarding cluster.

24. The method of claim 21, wherein kernel tasks are implemented as a loadable kernel module.

25. The method of claim 21, wherein kernel tasks are implemented as a device driver.

26. A method of packet forwarding, comprising:
    receiving a network packet;
    receiving state information from external agents;
    selecting a high priority forwarding path from forwarding paths based on the state information;
    performing address translation in the high priority forwarding path; and
    transmitting the network packet through the high priority forwarding path.

27. The method of claim 26, further comprising comparing the network packet to an external state table.

28. The method of claim 26, wherein selecting the high priority forwarding path includes applying a cryptographic signature to authenticate an origin.

29. The system of claim 1, wherein the packet classifier is configured to dynamically select a high priority forwarding path from among the plurality of forwarding paths based on determining that a classified packet is part of an existing flow.

* * * * *

UNITED STATES PATENT AND TRADEMARK OFFICE
CERTIFICATE OF CORRECTION

PATENT NO. : 7,522,627 B2
APPLICATION NO. : 10/244146
DATED : April 21, 2009
INVENTOR(S) : Vincent Lam et al.

It is certified that error appears in the above-identified patent and that said Letters Patent is hereby corrected as shown below:

Column 10, Line 22, please replace, "kernel tasks;" with --kernel layers;--

Column 10, Line 32, please replace, "kernel tasks;" with --kernel layers;--

Signed and Sealed this

Twenty-eighth Day of July, 2009

JOHN DOLL
*Acting Director of the United States Patent and Trademark Office*